(12) United States Patent
Wang et al.

(10) Patent No.: US 12,717,218 B2
(45) Date of Patent: Aug. 25, 2026

(54) ANGLE-ADJUSTABLE PROJECTION MECHANISM AND PROJECTOR

(71) Applicant: ZHONGSHAN BOLANG ELECTRONIC TECHNOLOGY CO., LTD., Zhongshan City (CN)

(72) Inventors: Gang Wang, Zhongshan City (CN); Ke Xian Liu, Zhongshan City (CN)

(73) Assignee: ZHONGSHAN BOLANG ELECTRONIC TECHNOLOGY CO., LTD., Zhongshan City (CN)

( * ) Notice: Subject to any disclaimer, the term of this patent is extended or adjusted under 35 U.S.C. 154(b) by 391 days.

(21) Appl. No.: 18/391,557

(22) Filed: Dec. 20, 2023

(65) Prior Publication Data

US 2025/0164866 A1 May 22, 2025

(30) Foreign Application Priority Data

Nov. 16, 2023 (CN) ........................ 202311535493.4

(51) Int. Cl.
*G03B 21/14* (2006.01)
*G03B 21/20* (2006.01)

(52) U.S. Cl.
CPC ......... *G03B 21/142* (2013.01); *G03B 21/145* (2013.01); *G03B 21/2033* (2013.01); *G03B 21/2066* (2013.01); *G03B 21/208* (2013.01)

(58) Field of Classification Search
CPC ................ G03B 21/142; G03B 21/145; G03B 21/2033; G03B 21/2066; G03B 21/208; G03B 21/28; G02B 7/1821
USPC ........................................................ 353/119
See application file for complete search history.

(56) References Cited

U.S. PATENT DOCUMENTS

2021/0157219 A1* 5/2021 Mikutsu ................ G03B 21/28

FOREIGN PATENT DOCUMENTS

JP H0561747 U * 8/1993 ............ G03B 21/28
JP 2004354680 A * 12/2004 ............ G02B 26/10

* cited by examiner

*Primary Examiner* — Magda Cruz
(74) *Attorney, Agent, or Firm* — Li & Cai Intellectual Property Office

(57) ABSTRACT

An angle-adjustable projection mechanism and a projector are provided. The adjustable angle projection mechanism includes a light source assembly, a condenser lens, a projection pattern assembly and an adjustable reflecting mirror assembly arranged sequentially along an optical path. A light beam emitted by the light source assembly is concentrated by the condenser lens and then passes through the projection pattern assembly and illuminates the adjustable reflecting mirror assembly. The adjustable reflecting mirror assembly includes a rotation adjustment member and a reflecting mirror, the rotation adjustment member is configured to drive the reflecting mirror to rotate to adjust a mirror angle of the reflecting mirror.

14 Claims, 5 Drawing Sheets

ANGLE-ADJUSTABLE PROJECTION MECHANISM AND PROJECTOR

FIELD OF THE DISCLOSURE

The present disclosure relates to the technical field of projection technology, and more particularly to an angle-adjustable projection mechanism and a projector.

BACKGROUND OF THE DISCLOSURE

A projector is an optical instrument that uses optical elements to enlarge the outline of a workpiece and project it onto a screen. At present, most of the projection mechanisms in existing projectors can only project on one directional plane. For example, the projector can project directly forward or above the projector. When using the projector for projection, it is necessary to determine an angular position of a reflector according to a projection surface of a projected image. In order to adjust a display position of the projected image, the user needs to move the position of the projector, or place the projector in an inclined state. It is more troublesome and causes a poor user experience.

SUMMARY OF THE DISCLOSURE

The purpose of the present disclosure is to provide an angle-adjustable projection mechanism and a projector in view of the defects and shortcomings of the existing technology. It has a reflecting mirror that can adjust an angle independently, which avoids the trouble of adjusting the projector and improves a user's experience.

In order to achieve the above objects, the technical solution adopted by the present disclosure is as follows.

An angle-adjustable projection mechanism is provided, including a light source assembly, a condenser lens, a projection pattern assembly and an adjustable reflecting mirror assembly that are arranged sequentially along an optical path. The adjustable reflecting mirror assembly includes a rotation adjustment member and a reflecting mirror, and the rotation adjustment member is configured to drive the reflecting mirror to rotate to adjust a mirror angle of the reflecting mirror.

In preferred embodiments, the angle-adjustable projection mechanism includes a housing, in which the light source assembly, the condenser lens, and the projection pattern assembly are disposed in the housing. A circuit board is further provided in the housing, the light source assembly is electrically connected to the circuit board, and a projection opening is provided at one end of the housing facing the reflecting mirror.

In preferred embodiments, the housing includes an upper housing and a lower housing that are detachably connected to each other, one end of the upper housing facing the adjustable reflecting mirror assembly extends and is provided with a first mounting block and a second mounting block that are opposite to each other, one end of the lower housing facing the adjustable reflecting mirror assembly extends and is provided with a mounting base, and a receiving groove is provided on a top of the mounting base.

In preferred embodiments, the rotation adjustment member includes a rotating shaft connected to the reflecting mirror, a hand adjustment handle is provided on one end of the rotating shaft, and a driving motor capable of driving the rotating shaft to rotate is provided on another end of the rotating shaft.

In preferred embodiments, an upper semicircular hole is provided on each of bottoms of the first mounting block and the second mounting block, a lower semicircular hole matching the upper semicircular holes is provided on the top of the mounting base, the upper semicircular hole and the lower semicircular hole are combined to form an assembly through hole, the rotating shaft rotatably passes through the assembly through hole, and a plurality of limiting blocks are provided on an outer surface of the rotating shaft to prevent the rotating shaft from coming out of the assembly through hole.

In preferred embodiments, the rotating shaft is connected to the reflecting mirror through a mounting bracket, a mounting groove is provided on a top of the mounting bracket, a mounting opening is provided at one end of the mounting groove, and an engagement slot that is snap-connected to the reflecting mirror is provided on an inner wall of the mounting groove.

In preferred embodiments, an imaging lens is provided between the adjustable reflecting mirror assembly and the projection pattern assembly, and after a light beam from the light source assembly is focused through the imaging lens, the light beam is projected onto the adjustable reflecting mirror assembly.

In preferred embodiments, a power socket is provided on one side wall of the housing, and the power socket is electrically connected to the circuit board.

In preferred embodiments, the light source assembly includes an LED light source or a laser light source.

A projector comprising an angle-adjustable projection mechanism is provided.

By virtue of the above technical solution, the beneficial effects of the present disclosure are as follows. The light source assembly, the condenser lens, the projection pattern assembly and the adjustable reflecting mirror assembly are arranged sequentially along the optical path, so that the light beam emitted by the light source assembly is concentrated by the condenser lens and then passes through the projection pattern assembly and illuminates the adjustable reflecting mirror assembly. Since the adjustable reflecting mirror assembly includes the rotation adjustment member and the reflecting mirror, the rotation adjustment member can drive the reflecting mirror to rotate to adjust the mirror angle of the reflecting mirror, so as to facilitate a user to adjust a projection angle without moving the projector or placing the projector in an inclined state in order to adjust the projection angle, thereby improving the user experience.

BRIEF DESCRIPTION OF THE DRAWINGS

In order to explain the embodiments of the present disclosure or the technical solutions in the prior art more clearly, the drawings needed to be used in the description of the embodiments or the prior art will be briefly introduced below. Obviously, the drawings in the following description are only some embodiments of the present disclosure. For those of ordinary skill in the art, other drawings can be obtained based on these drawings without exerting any creative effort.

Figure 1:
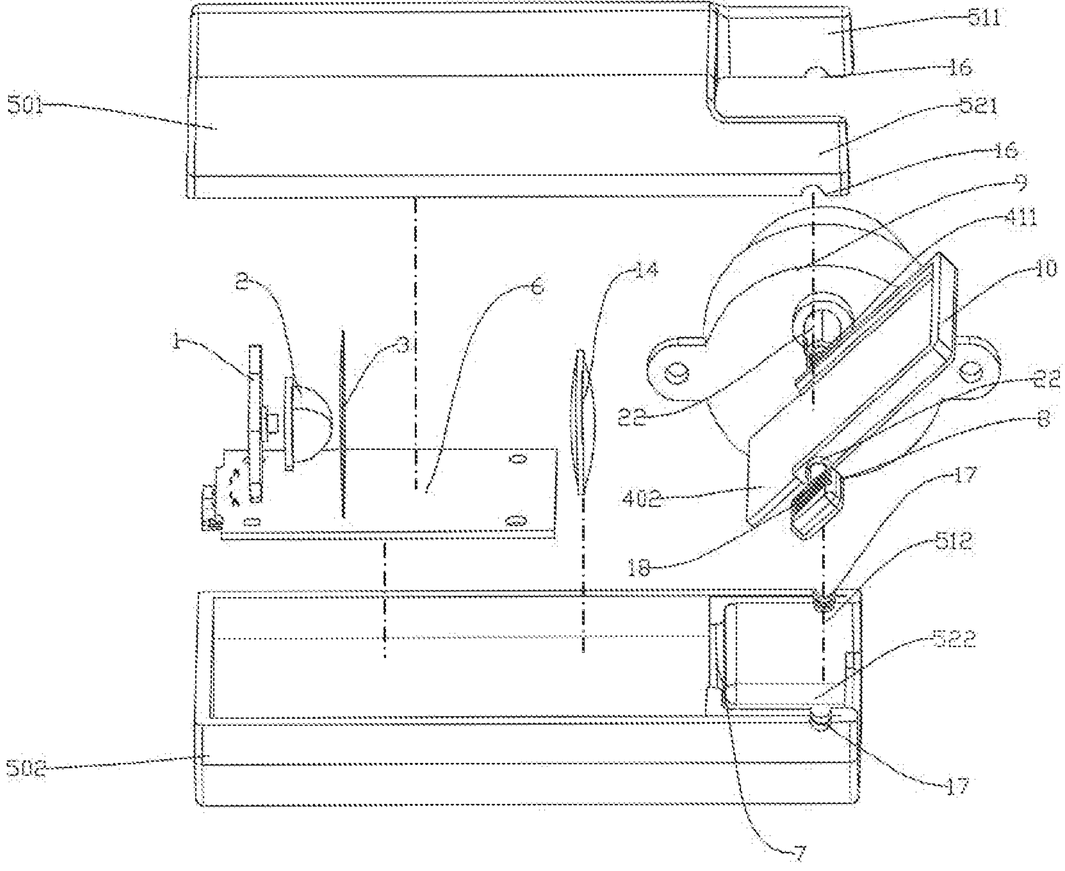
FIG. 1 is a schematic exploded view according to the present disclosure.
Figure 2:
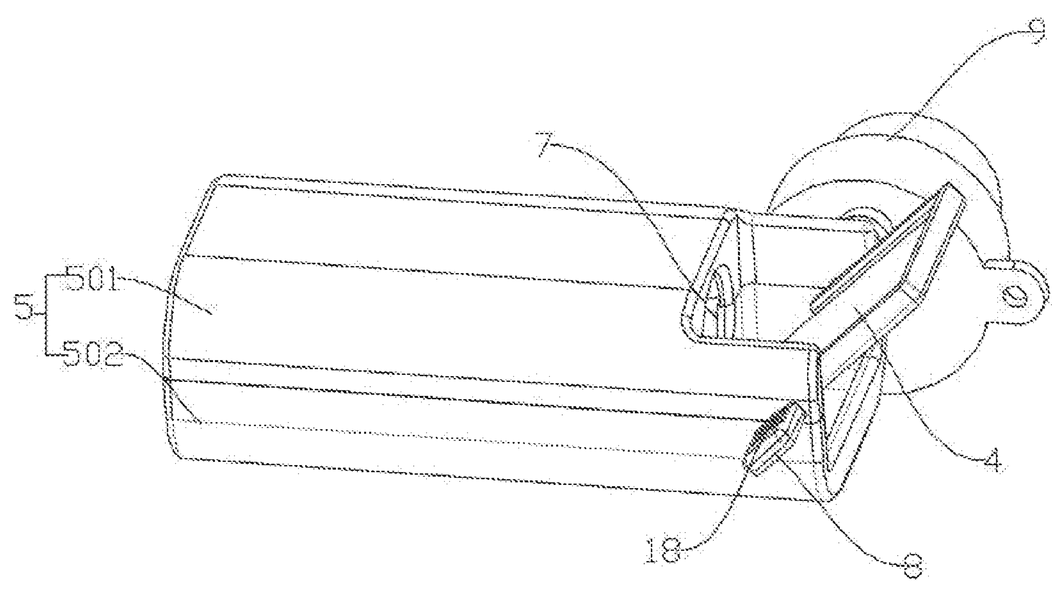
FIG. 2 is a schematic overall side view according to the present disclosure.
Figure 3:
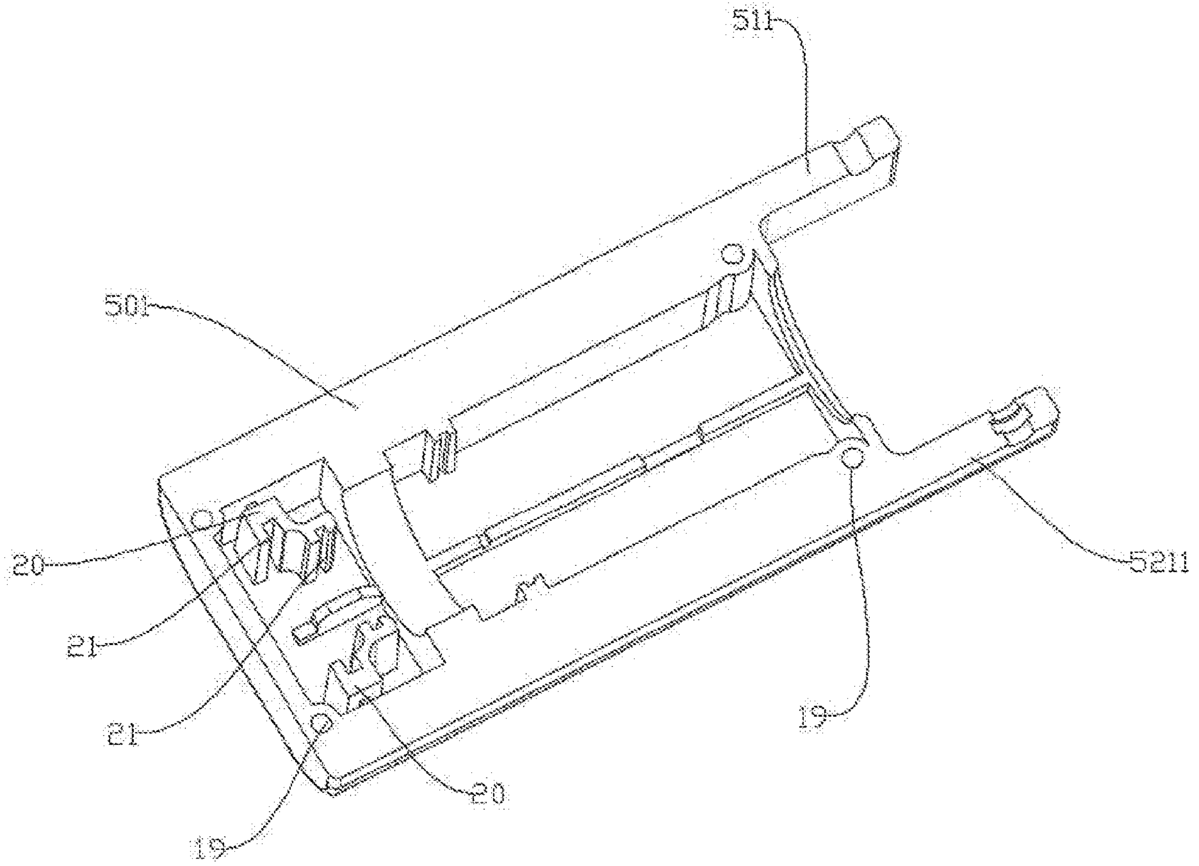
FIG. 3 is a schematic side view of an upper housing according to the present disclosure.
Figure 4:
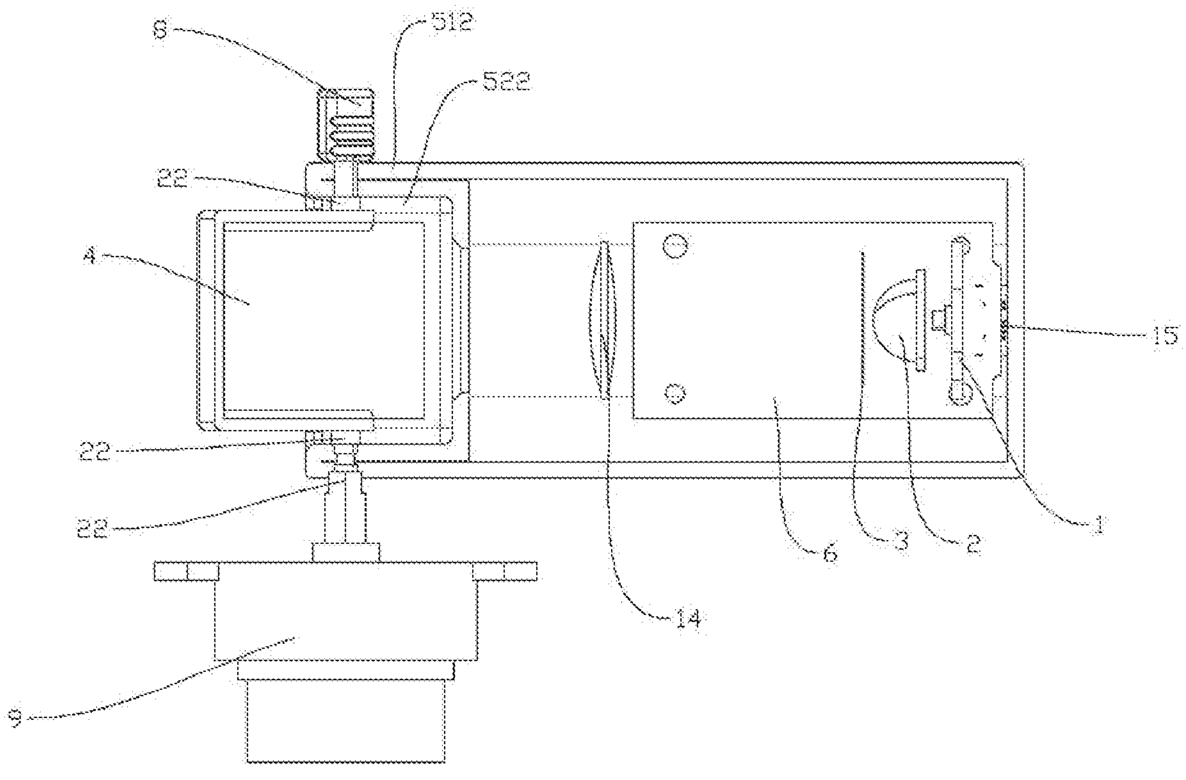
FIG. 4 is a schematic side view of a lower housing according to the present disclosure.

Reference numeral: 1, light source assembly; 2, condenser lens; 3, projection pattern assembly; 4, adjustable reflecting mirror assembly; 402, reflecting mirror; 411, rotation axis; 5, housing; 501, upper housing; 502, lower housing; 511, first mounting block; 521, second mounting block; 512, mounting base; 522, receiving groove; 6, circuit board; 7, projection opening; 8, manual adjustment handle; 9, driving motor; 10, mounting bracket; 11, mounting groove; 12, mounting opening; 13, engagement slot; 14, imaging lens; 15, power socket; 16, upper semicircular hole; 17, lower semicircular hole; 18, anti-skid pattern; 19, plug-in hole; 20, positioning block; 21, positioning slot; 22, limiting block.

DETAILED DESCRIPTION OF THE EXEMPLARY EMBODIMENTS

The present disclosure will be further described in detail below with reference to the accompanying drawings.

This specific embodiment is only an explanation of the present disclosure, and is not a limitation of the present disclosure. Those skilled in the art can make modifications to this embodiment without creative contribution as needed after reading this description, and as long as they are within the scope of the claims of the present disclosure, they are protected by the patent law.

Embodiment 1: The present embodiment relates to an angle-adjustable projection mechanism. Referring to FIG. 1 to FIG. 5, the angle-adjustable projection mechanism includes a light source assembly 1, a condenser lens 2, a projection pattern assembly 3 and an adjustable reflecting mirror assembly 4 that are arranged sequentially along the optical path. The adjustable reflecting mirror assembly 4 includes a rotation adjustment member and a reflection mirror 402. The rotation adjustment member can drive the reflecting mirror 402 to rotate to adjust the mirror angle of the reflecting mirror 402. Furthermore, when a user needs to adjust a projection angle, the user can control the rotation of the rotation adjustment member. When the rotation adjustment member rotates, it drives the reflecting mirror 402 to rotate, so that it is convenient for the user to adjust the mirror angle of the reflecting mirror 402, thereby achieving the purpose of adjusting the projection angle.

In the embodiment, the angle-adjustable projection mechanism includes a housing 5. The light source assembly 1, the condenser lens 2, and the projection pattern assembly 3 are all disposed in the housing 5. A circuit board 6 is also provided in the housing 5. The light source assembly 1 is electrically connected to the circuit board 6, and a projection opening 7 is provided at one end of the housing 5 facing the reflecting mirror 402. Further, the housing 5 can be used to protect the light source assembly 1, the condenser lens 2, and the projection pattern assembly 3 to prevent external objects from causing damage to the light source assembly 1, the condenser lens 2, and the projection pattern assembly 3.

Further, referring to FIG. 1 to FIG. 5, the housing 5 includes an upper housing 501 and a lower housing 502 that are detachably connected to each other. One end of the upper housing 501 facing the adjustable reflecting mirror assembly 4 extends and is provided with a first mounting block 511 and a second mounting block 521 that are opposite to each other. One end of the lower housing 502 facing the adjustable reflecting mirror assembly 4 extends and is provided with a mounting base 512, and a receiving groove 522 is provided on a top of the mounting base 512. The receiving groove 522 provides sufficient space for the rotation of the reflecting mirror 402. Specifically, the upper housing 501 is provided with a plug-in post (not shown in the figures), and the lower housing 502 is provided with a plug hole 19 matching the plug-in post (not shown in the figures). The upper housing 501 and the lower housing 502 are detachably connected to each other through an insertion connection between the plug hole 19 and the plug post. In the present embodiment, two opposite positioning blocks 20 are provided on a side of the upper housing 501 facing the lower housing 502. The positioning block 20 is provided with a plurality of positioning slots 21, and the light source assembly 1 and/or the condenser lens 2 can be correspondingly inserted into the positioning slot 21 to position the light source assembly 1 and/or the condenser lens 2.

In the present embodiment, each of bottoms of the first mounting block 511 and the second mounting block 521 is provided with an upper semicircular hole 16, and the top of the mounting base 512 is provided with lower semicircular holes 17 that match the upper semicircular holes 16. The upper semicircular hole 16 and the lower semicircular hole 17 are combined to form an assembly through hole, and a rotating shaft 411 rotatably passes through the assembly through hole. During assembly, the rotating shaft 411 can be placed in the lower semicircular hole 17, and then the upper housing 501 and the lower housing 502 are assembled. Then, the upper semicircular hole 16 and the lower semicircular hole 17 are combined to form the assembly through hole. The rotating shaft 411 rotatably passes through the assembly through hole. Furthermore, an outer surface of the rotating shaft 411 is provided with a plurality of limiting blocks 22 that prevents the rotating shaft 411 from coming out of the assembly through hole.

In the present embodiment, the rotation adjustment member includes the rotating shaft 411 connected to the reflecting mirror 402. One end of the rotating shaft 411 is provided with a manual adjustment handle 8, and another end of the rotation shaft 411 is provided with a driving motor 9 capable of driving the rotating shaft 411 to rotate. Specifically, the user can rotate the rotating shaft 411 by the manual adjustment handle 8 to drive the reflecting mirror 402 to rotate. In the present embodiment, the rotation shaft 411 can be a damping rotation shaft 411. When the projection mechanism is placed at a higher position, the user needs to raise it to be able to rotate the rotating shaft 411 through the manual adjustment handle 8. In addition, the user can control an operation of the driving motor 9 to control the rotation of the rotating shaft 411. The driving motor 9 can be controlled through a cooperation of a remote controller and a receiver.

Figure 5:
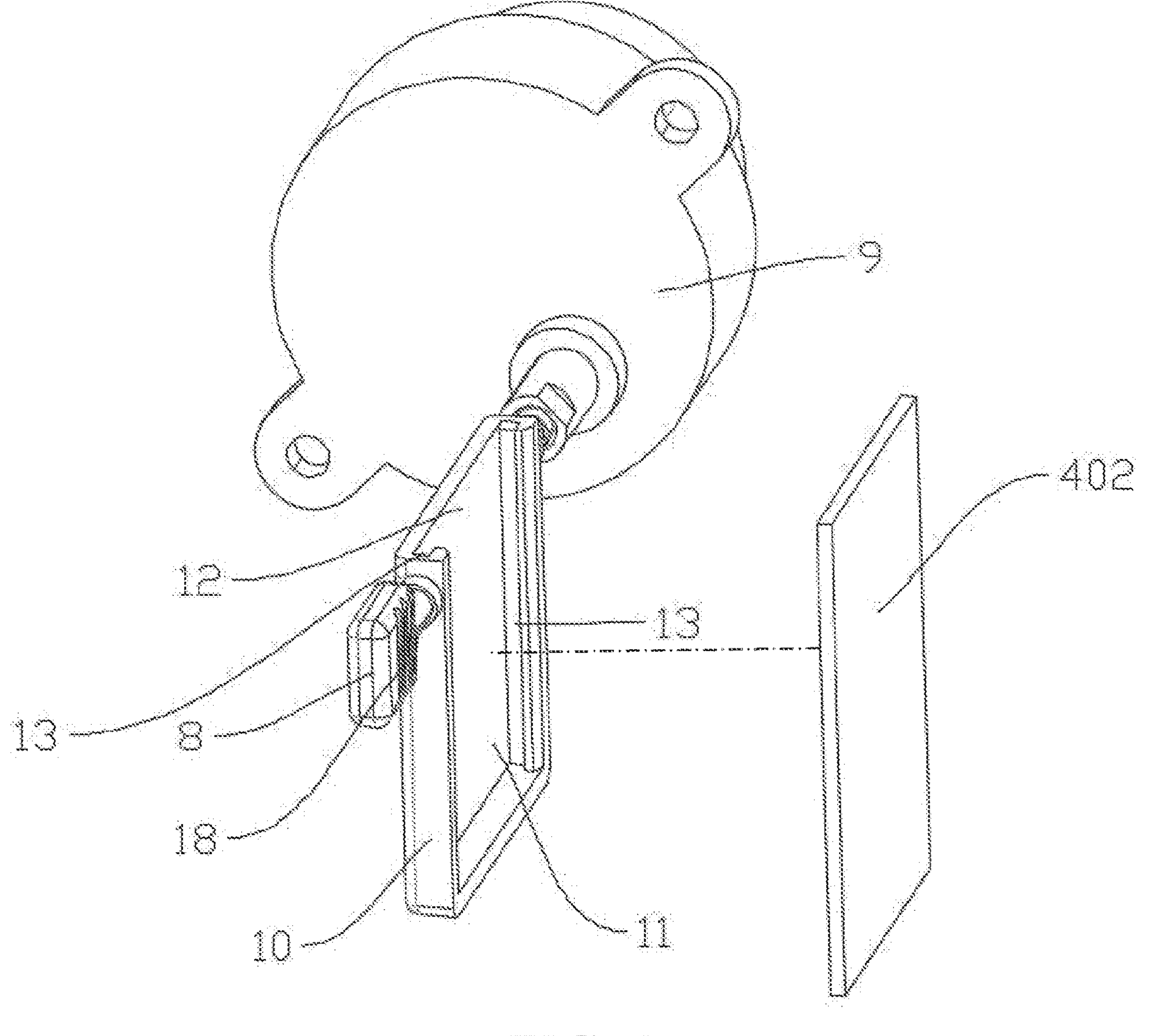
FIG. 5 is a schematic exploded view of an adjustable reflector assembly according to the present disclosure.

In the present embodiment, referring to FIG. 5, the rotating shaft 411 is connected to the reflecting mirror 402 through a mounting bracket 10. A top of the mounting bracket 10 is provided with a mounting groove 11. One end of the mounting groove 11 is provided with a mounting opening 12. An inner wall of the mounting groove 11 is provided with an engagement groove 13 that is engaged to the reflecting mirror 402. Specifically, during assembly, the reflecting mirror 402 can be inserted into the mounting groove 11 from the mounting opening 12. In addition, the reflecting mirror 402 is engaged to the engagement slot 13, so that the reflecting mirror 402 is assembled on the mounting bracket 10.

In the present embodiment, an imaging lens 14 is provided between the adjustable mirror assembly 4 and the projection pattern assembly 3. After the light beam of the light source assembly 1 is focused through the imaging lens

14, the light beam is projected onto the reflecting mirror 402. Furthermore, when the light source is an LED light source, since the light beam emitted by the LED light source is relatively scattered, the imaging lens 14 needs to be provided so that the light beam emitted by the LED light source is focused through the imaging lens 14 and then projected onto the reflecting mirror 402 to ensure the clarity of the projection pattern.

In the present embodiment, a power socket 15 is provided on one side wall of the housing 5, and the power socket 15 is electrically connected to the circuit board 6. Specifically, an external power supply can be connected to the power socket 15 by the user, thereby providing a power supply for the angle-adjustable projection mechanism.

In the present embodiment, the light source assembly 1 includes an LED light source or a laser light source. When the light source assembly 1 is the LED light source, the imaging lens 14 needs to be assembled. When the light source assembly 1 is the laser light source, there is no need to assemble the imaging lens 14.

In the present embodiment, the manual adjustment handle 8 is square-shaped, and an outer surface of the manual adjustment handle 8 is provided with anti-slip patterns 18 to facilitate the user to manually rotate the rotating shaft 411.

Embodiment 2: The difference from Embodiment 1 is that in the present embodiment, the upper housing 501 is provided with a countersunk through hole penetrating a top and a bottom of the upper housing 501, and a bottom of the lower housing 502 is provided with a threaded hole corresponding to the countersunk through hole. A countersunk screw can be connected to the threaded hole through the countersunk through hole, so that the upper housing 501 and the lower housing 502 can be detachably connected to each other.

The above is only used to illustrate the technical solution of the present disclosure without limiting it. Other modifications or equivalent substitutions made by those of ordinary skill in the art to the technical solution of the present disclosure shall be covered by the claims of the present disclosure as long as they do not depart from the spirit and scope of the technical solution of the present disclosure.

What is claimed is:

1. An angle-adjustable projection mechanism, comprising:

a light source assembly (1);

a condenser lens (2);

a projection pattern assembly (3);

an adjustable reflecting mirror assembly (4);

wherein the light source assembly (1), the condenser lens (2), the projection pattern assembly (3), and the adjustable reflecting mirror assembly (4) are arranged sequentially along an optical path;

wherein the adjustable reflecting mirror assembly (4) includes a rotation adjustment member and a reflecting mirror (402), and the rotation adjustment member is configured to drive the reflecting mirror (402) to rotate to adjust a mirror angle of the reflecting mirror (402); and a housing (5), wherein each of the light source assembly (1), the condenser lens (2), and the projection pattern assembly (3) is disposed in the housing (5), a circuit board (6) is further provided in the housing (5), the light source assembly (1) is electrically connected to the circuit board (6), and a projection opening (7) is provided at one end of the housing (5) facing the reflecting mirror (402);

wherein the housing (5) includes an upper housing (501) and a lower housing (502) that are detachably connected to each other, one end of the upper housing (501) facing the adjustable reflecting mirror assembly (4) extends and is provided with a first mounting block (511) and a second mounting block (521) that are opposite to each other, one end of the lower housing (502) facing the adjustable reflecting mirror assembly (4) extends and is provided with a mounting base (512), and a receiving groove (522) is provided on a top of the mounting base (512).

2. The angle-adjustable projection mechanism according to claim 1, wherein the rotation adjustment member includes a rotating shaft (411) connected to the reflecting mirror (402), a hand adjustment handle (8) is provide on one end of the rotating shaft (411), and a driving motor (9) capable of driving the rotating shaft (411) to rotate is provided on another end of the rotating shaft (411).

3. The angle-adjustable projection mechanism according to claim 2, wherein an upper semicircular hole (16) is provided on each of bottoms of the first mounting block (511) and the second mounting block (521), a lower semicircular hole (17) matching the upper semicircular holes (16) is provided on the top of the mounting base (512), the upper semicircular hole (16) and the lower semicircular hole (17) are combined to form an assembly through hole, the rotating shaft (411) rotatably passes through the assembly through hole, and a plurality of limiting blocks (22) are provided on an outer surface of the rotating shaft (411) to prevent the rotating shaft (411) from coming out of the assembly through hole.

4. A projector comprising the angle-adjustable projection mechanism as claimed in claim 3.

5. The angle-adjustable projection mechanism according to claim 2, wherein the rotating shaft (411) is connected to the reflecting mirror (402) through a mounting bracket (10), a mounting groove (11) is provided on a top of the mounting bracket (10), a mounting opening (12) is provided at one end of the mounting groove (11), and an engagement slot (13) that is snap-connected to the reflecting mirror (402) is provided on an inner wall of the mounting groove (11).

6. A projector comprising the angle-adjustable projection mechanism as claimed in claim 5.

7. A projector comprising the angle-adjustable projection mechanism as claimed in claim 2.

8. The angle-adjustable projection mechanism according to claim 1, wherein an imaging lens (14) is provided between the adjustable reflecting mirror assembly (4) and the projection pattern assembly (3), and after a light beam from the light source assembly (1) is focused through the imaging lens (14), the light beam is projected onto the adjustable reflecting mirror assembly (4).

9. A projector comprising the angle-adjustable projection mechanism as claimed in claim 8.

10. The angle-adjustable projection mechanism according to claim 1, wherein a power socket (15) is provided on one side wall of the housing (5), and the power socket (15) is electrically connected to the circuit board (6).

11. A projector comprising the angle-adjustable projection mechanism as claimed in claim 10.

12. The angle-adjustable projection mechanism according to claim 1, wherein the light source assembly (1) includes an LED light source or a laser light source.

13. A projector comprising the angle-adjustable projection mechanism as claimed in claim 12.

14. A projector comprising the angle-adjustable projection mechanism as claimed in claim 1.

* * * * *